United States Patent [19]

Messinger et al.

[11] Patent Number: 4,669,322

[45] Date of Patent: * Jun. 2, 1987

[54] DEVICE FOR CONVERTING THE ROTARY MOTION OF AN ECCENTRIC INTO A RECIPROCATING MOTION

[75] Inventors: Werner Messinger, Kronberg; Karl Trölltsch, Frankfurt am Main, both of Fed. Rep. of Germany

[73] Assignee: Braun Aktiengesellschaft, Kronberg, Fed. Rep. of Germany

[*] Notice: The portion of the term of this patent subsequent to Mar. 17, 2004 has been disclaimed.

[21] Appl. No.: 680,858

[22] Filed: Dec. 12, 1984

[30] Foreign Application Priority Data

Dec. 23, 1983 [DE] Fed. Rep. of Germany ....... 3346655

[51] Int. Cl.⁴ .................. F16H 21/18; B26B 19/04
[52] U.S. Cl. .................................... 74/42; 74/581
[58] Field of Search ................ 74/40, 519, 581, 42

[56] References Cited

U.S. PATENT DOCUMENTS 4,367,658  1/1983  Rochelt .................................. 74/40

FOREIGN PATENT DOCUMENTS

| | | |
|---|---|---|
| 2117319 | 10/1972 | Fed. Rep. of Germany ........ 74/581 |
| 2409592 | 2/1974 | Fed. Rep. of Germany . |
| 2616391 | 12/1976 | Fed. Rep. of Germany ........ 74/519 |
| 2631751 | 2/1977 | Fed. Rep. of Germany ........ 74/581 |
| 2603207 | 8/1977 | Fed. Rep. of Germany ........ 74/519 |
| 2910469 | 3/1979 | Fed. Rep. of Germany . |
| 3213099 | 4/1982 | Fed. Rep. of Germany . |
| 57-54141 | 11/1982 | Japan . |
| 57-60788 | 12/1982 | Japan . |
| 624331 | 6/1949 | United Kingdom .................. 74/519 |

Primary Examiner—Lawrence J. Staab
Attorney, Agent, or Firm—Raymond J. De Vellis

[57] ABSTRACT

In a device for converting the rotary motion of an eccentric driven by a motor shaft into a reciprocating motion of a working tool coupled with a shaft pin in electrically powered appliances, in whose housing a double-armed rocker arm connected to the shaft pin is pivotably mounted, an oscillating body is provided for conversion of motion between the rocker arm and the eccentric, said body consisting of at least one flexible stud or a stud provided with a film hinge, and a connecting rod with a connecting rod head running at least partially parallel to this stud and comprising a film hinge, whereby the head of the connecting rod is connected to the eccentric and the stud is rigidly attached to the rocker arm.

4 Claims, 5 Drawing Figures

DEVICE FOR CONVERTING THE ROTARY MOTION OF AN ECCENTRIC INTO A RECIPROCATING MOTION

BACKGROUND OF THE INVENTION

The invention relates to a device for converting the rotary motion of an eccentric driven by a motor shaft into a reciprocating motion of a working tool coupled with a shaft pin in electrically driven appliances, in whose housing a double-armed lever provided with a shaft pin is pivotably mounted.

German Pat. No. 2,409,592 teaches a dry shaver with a rotary motor, an oscillating lower cutter, and a crank and rocker linkage for converting the rotary motion of the motor into the oscillating motion of the lower cutter, whereby the motor shaft is aligned perpendicular to the pivot axis of the rocker arm engaging the lower cutter and is disposed laterally displaced by the length of the crank arm. The crank arm is linked at one end via an elastic gimbal mount with the eccentric on the motor shaft and at the other end via a ball joint with the rocker arm. This type of motion transmission is very expensive and extremely difficult to manufacture because of the tolerances to be maintained for the bearings and articulated parts. Increased play or slippage in the ball joint necessarily produces chattering in the ball joint, while less play results in an increased energy requirement.

Japanese disclosure document No. 57-54141 teaches a dry shaver with a rotary motor, an oscillating lower cutter, and a double-armed rocker arm, wherein the motor shaft of the rotary motor and the bearing of the rocker arm lie on a common axis and the eccentric mounted on the motor shaft directly engages the rocker arm. To convert the rotary motion of the motor shaft into an oscillating motion of the rocker arm, the eccentric pin as well as the bearing pin of the rocker arm engage matching recesses in the rocker arm with relatively considerable play. Because of the continuous changes in position, this results not only in considerable chattering but also considerable frictional losses, which have a disadvantageous effect as a result of increased energy consumption in appliances powered by replaceable or rechargeable batteries.

In addition, the considerable bearing play between the bearing pin and the rocker arm causes the lower cutter fastened to the rocker arm to move away from the cutting foil, thus having a highly disadvantageous effect on the cutting action between the lower cutting and the cutting foil.

Japanese Utility Model No. 57-60788 teaches a dry shaver with a rotary motor, an oscillating lower cutter, and a crank and rocker linkage to convert the rotary motion of the motor into an oscillating motion of the lower cutter. The motor shaft is aligned perpendicular to the pivot axis of the rocker arm engaging the lower cutter, and is disposed displaced laterally by the length of the crank arm. The crank arm is made fork-shaped in the vicinity of the rocker arm, whereby the rocker arm engages this fork and is held in a pivotable position in the fork by means of an articulation pin. The crank arm is also connected by an eccentric bearing provided in the head of the connecting rod with the motor shaft of the rotary motor. An important disadvantage of this type of transmission is that the swing of the rocker arm is compensated by the crank arm only with the accompaniment of considerable losses to pressure and friction.

The goal of the present invention is to develop a device of the species recited hereinabove wherein conversion of the rotary motion into a reciprocating motion is accomplished with minimum possible losses in driving energy. The device is intended to ensure unimpeded motion in all required degree of freedom with little friction, and to operate with low noise. In addition the device must be so designed that both the arrangement of the motor shaft of the rotary motor and the mounting of the double-armed lever on a common axis and on axes staggered with respect to one another are possible.

German OS No. 29 10 469 teaches a swing frame with a linearly oscillating swing beam connected to two drive pins with a lower cutter and fastened to the housing by two pairs of flexible strips. The connecting rod which sets the swing beam in oscilating motion is part of an additional swing frame, partially composed of flexible strips and formed on the swing beam. The pressure exerted by the user when shaving is transmitted directly to the swing beam via the lower cutter coupled to said beam, and thus to the oscillating system, thereby exerting a disadvantageous influence of its oscillating behavior.

SUMMARY OF THE INVENTION

According to the invention, this goal is achieved by virtue of the fact that the double-armed rocker arm is provided with a U-shaped recess at the end opposite the shaft pin, by the fact that an oscillating body is rigidly fastened to the two legs of the U-shaped recess, by the fact that the oscillating body consists at least of one stud and a connecting rod running at least partially parallel to the stud, by the fact that the connecting rod is provided with a film hinge, and by the fact that the oscillating body is connected with the motor shaft via the connecting rod and the eccentric.

The solution according to the invention is characterized by the fact that only a single bearing point is required to convert the motion. All degrees of freedom are provided by means of the stud or studs which are either made flexible or are each provided with a film hinge, as well as by the connecting rod provided with a film hinge. Film hinges operate noiselessly and also consume less energy than pivot bearings.

A particular advantage is the compact design and arrangement of the parts of the device, which allows a plurality of additional embodiments each of which offers additional advantages. According to one embodiment, provision is made for two studs to run parallel to one another, and for only two of the stud ends to be connected together by a cross stud, and for the connecting rod to be formed on the cross stud between the two studs.

Parallel return of the stud or studs in the direction of the head of the connecting rod produces and especially compact and compressed design for the oscillating body.

In order for the connecting rod to follow the eccentric motion of the eccentric, a film hinge is formed running parallel to central axis Z in the connecting rod of the oscillating body.

The height differential resulting from the oscillating motion of the rocker arm is compensated by the oscillating body in such fashion that the stud or studs fastened to the double-armed rocker arm is/are made flexible.

An even better result as regards height compensation is achieved in a preferred embodiment by virtue of the fact that a hinge running transversely to central axis Z of the connecting rod head is formed in the stud or studs in the vicinity of the attachment to the two legs of the rocker arm.

The oscillating body can be given different forms within the scope of the invention. These design variations make it possible for the motor shaft of the rotary motor and the bearing of the double-armed rocker arm to be disposed both on a common axis and on axes which are laterally displaced with respect to one another, depending on which is desired or required by the design. In the former case, the length of the connecting rod and stud or studs is chosen so that the central axis passing through the bore in the head of the connecting rod coincides with the central axis of the rocker arm; in the latter application, the length ratio of the connecting rod to the stud or studs is determined by the axial displacement from the central axis of the motor shaft to the central axis of the rocker arm mount.

BRIEF DESCRIPTION OF THE DRAWINGS

The invention is described hereinbelow with reference to the drawings, wherein preferred embodiments of devices for conversion of motion, for example that of a dry shave, are shown as follows.

DETAILED DESCRIPTION

Figure 1:
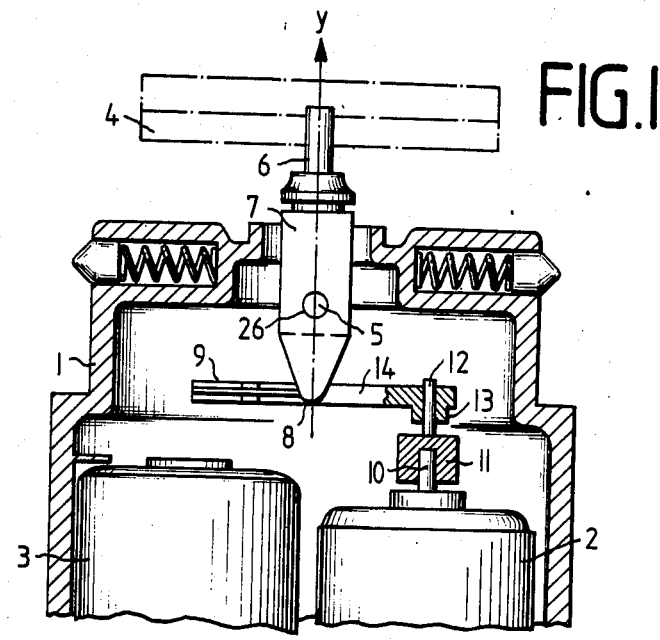
FIG. 1 is sectional front view through the plane of symmetry of a dry shaver in the area of the device according to the invention.

FIG. 1 shows the housing of a dry shaver 1, in section, a rotary motor at 2, a dry battery at 3, and a reciprocating operating element at 4.

The device for converting the rotary motion of rotary motor 2 into a reciprocating motion of operating element 4 consists of a double-armed rocker arm 7 pivotably mounted on a shaft 5 and provided with a shaft pin 6, an oscillating body 9 rigidly fastened to the end 8 of the rocker arm which is opposite shaft pin 6, and an eccentric 11 disposed on motor shaft 10 of rotary motor 2, said eccentric being connected via an eccentric pin 12 with the connecting rod head 13 of connecting rod 14 of oscillating body 9.

In the embodiment shown, rocker arm 7 is in the middle position, i.e. at bottom dead center of the pivoting motion to be executed by rocker arm 7. The central axis marked Y runs in the vertical direction through the axial mid-point of bearing bore 26 and through the axial mid-point of shaft 5 consisting of a pin formed on housing 1. Rotary motor 2 with its shaft 10 and rotary axis is disposed staggered laterally with respect to central axis Y.

Figure 2:
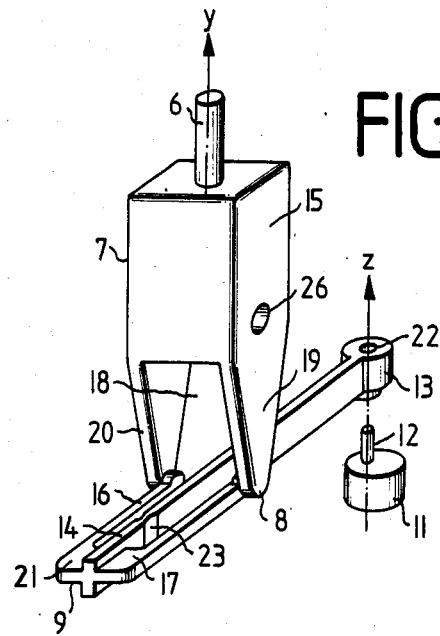
FIG. 2 is a perspective view of a rocker arm, an oscillating body with two studs and a connecting rod, and an eccentric.

FIG. 2 shows a perspective view of the device according to FIG. 1. Bearing bore 26 provided in rocker arm 7 produces the double-armed nature of the latter. The ends of the rocker arm are designated 8 and 15, whereby the shaft pin 6 required for coupling to an operating element 4 is provided in end 15 of the rocker arm and a U-shaped recess 18 is provided in end 8 of the rocker arm, said recess 18 dividing end 8 of the rocker arm into two legs 19 and 20.

Oscillating body 9 consists of two studs 16 and 17 and a connecting rod 14 disposed between these studs, with connecting rod head 13. Studs 16 and 17 as well as connecting rod 14 are connected together by a cross stud 21. Starting at cross stud 21, studs 16 and 17 run parallel to the connecting rod up to legs 19 and 20, to which they are each rigidly fastened inside U-shaped recess 18, e.g. by means of a welded or adhesive connection. Connecting rod 14 guided through U-shaped recess 18 has a bore 22 in its connecting rod head 13, the central axis of said bore being designated Z, to receive eccentric pin 12 of eccentric 11.

A film hinge 23 is foremd in connecting rod 14 at a predetermined distance from connecting rod head 13 running parallel to central axis Z of bore 22, said hinge conferring the necessary lateral freedom of movement on connecting rod 14. The equalization in height required by the oscillating motion of rocker arm 7 between end 8 of the rocker arm and eccentric 11 is provided by studs 16 and 17 which exhibit flexible properties.

Figure 3:
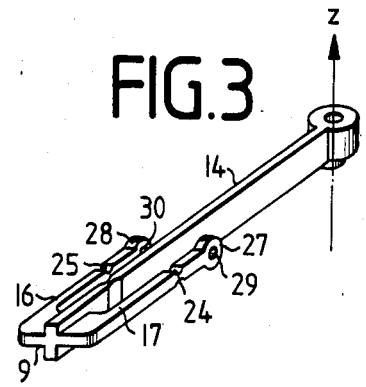
FIG. 3 is a perspective view of a rocker arm, an oscillating body with a stud and connecting arm, as well as an eccentric.

An height equalization between end 8 of the rocker arm and eccentric 11 is accomplished as shown in FIG. 3 by the fact that a film hinge 24, 25 is formed in the vicinity of the point at which the two studs 16 and 17 are attached to legs 19 and 20 of rocker arm 7 in the corresponding studs 16, 17, said hinges 24 and 25 running crosswise to central axis Z of bore 22 in the head of connecting rod 14 and in the axial direction of bearing bore 26. At the ends of each of the two studs 16 and 17 a connecting head 27, 28 with a bore 29, 30 is provided, into which corresponding projections located on legs 19, 20 (not shown) engage to produce a locally defined attachment of the oscillating body to legs 19, 20.

Figure 4:
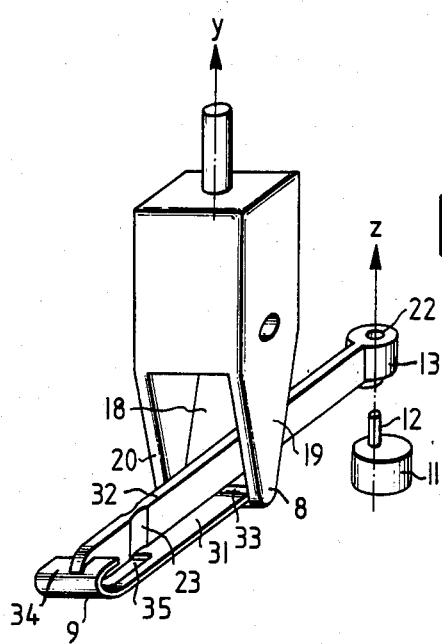
FIG. 4 is a perspective view of an oscillating body with three film hinges.

FIG. 4 shows another embodiment of an oscillating body 9 consisting of a stud 31 and a connecting rod 32. Stud 31 is rigidly fastened by one of its ends via a connecting head 33 in U-shaped recess 18 to the lower ends of legs 19, 20, while the other end 34 of the stud is made semicircular, so that the narrow connecting rod 32 formed thereon runs parallel to stud 31. Connecting rod 32 is guided through U-shaped recess 18 up to eccentric pin 12 of eccentric 11. A reinforcing rib 35 is provided in the semicircular stud end 24 between connecting rod 32 and stud 31, said rib conferring a certain degree of rigidity on oscillating body 9 in this area and displacing the height equalization between rocker arm end 8 and eccentric 11 via flexible stud 31 to the area of connecting head 33.

Figure 5:
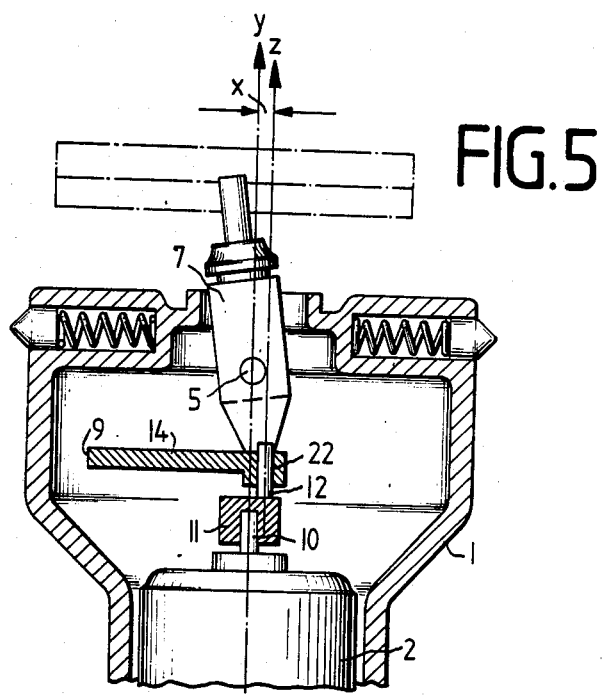
FIG. 5 is a sectional front view through the plane of symmetry of a dry shaver in the vicinity of the device according to the invention.

The flexible nature of stud 31 is produced by a relatively thin wall thickness of said stud. If stud 31 is given a thicker wall, so that it assumes a rigid characteristic, the height equalization can be effected by a film hinge running parallel to connecting head 33. The lateral freedom of movement of connecting rod 32 is ensured by a film hinge 23 formed on connecting rod 32 at a predetermined distance from head 13, said hinge running parallel to central axis Z of bore 22. FIG. 5 shows a section through housing 1 of a dry shaver, wherein the central axis of motor shaft 10 of rotary motor 2 coincides in the vertical projection with central axis Y running vertically through the center of bearing bore 26. The travel of eccentric pin 12 provided on eccentric 11 around central axis Y is designated X.

Eccentric 11 and oscillating body 9 are shown in section and rocker arm 7 is shown in partial section, whereby the section runs through connecting rod 14. The oscillating body 9 shown corresponds in its design and function to the oscillating body 9 shown and described in FIG. 3, with the difference that central axis Z of bore 22 in connecting rod head 13 of connecting rod 14 which receives eccentric pin 12 when the rocker arm is a bottom dead center, coincides in the vertical direction with central axis Y, while according to FIG. 2, with rocker arm 7 at bottom dead center, central axis Z passing through bore 22 is offset laterally with respect to central axis Y.

Studs 16 and 17 which are not visible and are each provided with a film hinge 25 and 24 and are rigidly connected by connecting heads 28 and 29 to the lower ends of legs 20 and 19, each comprise a film hinge 25, 24, which compensates for the height differential resulting from the pivoting motion of rocker arm 7 from vertical axis Y, where the bottom dead center position is located, to the top dead center position after completing travel X.

Instead of the oscillating body shown in FIG. 3, an oscillating body according to FIG. 4 can be provided in the device according to FIG. 5. In this embodiment, oscillating body 9 according to FIG. 4 is rotated through 180 degrees so that connecting rod 32 is below end 8 of the rocker arm. The attachment of oscillating body 9 is provided rigidly in the U-shaped recess by connecting head 33 to legs 19 and 20. Central axis Z of bore 22 receiving eccentric pin 12 in the connecting rod head, when the rocker arm is at bottom dead center, coincides in the vertical projection with central axis Y and, in the horizontal projection, is offset by half the travel X relative to central axis Y.

In all the embodiments described, central axis Y essentially runs through the axial mid-point of shaft pin 6, when rocker arm 7 is at bottom dead center. In the embodiment shown in FIG. 5, central axis Y also passes through the central axis of motor shaft 10 of rotary motor 25.

The length of connecting rods 14 and 32 as well as those of corresponding studs 16, 17, and 31 depend on the individual application, as is evident from the arrangements shown in FIGS. 1 and 5.

While embodiments and applications of the invention have been shown and described, it will be apparent to those skilled in the art that many more modifications are possible without departing from the inventive concepts herein described.

What is claimed as new and desired to be secured by Letters Patent of the United States is:

1. A device for converting rotary motion of an eccentric driven by a shaft into reciprocating motion of a working tool in a power appliance having a housing including a shaft pin means, comprising:
   a double-armed rocker arm having a central axis (Y), including an upper lever arm portion, having a free end, and a lower lever arm portion, having a free end, and a bearing means, having a pivot axis, located between said upper lever arm portion and said lower lever arm portion for engagmenet with the shaft pin means of the appliance;
   a shaft pin extending from the free end of said upper arm portion for driving the working tool;
   said lower lever arm portion having a U-shaped recess and first and second legs, each of said legs having a free end;
   a head member having a central axis (Z), said central axis (Z) of said head member and said central axis (Y) of said double-armed rocker arm being laterally offset and in the same vertical plane when said double-armed rocker arm is at bottom dead center;
   an oscillating body rigidly connected to said free ends of said first and second legs, and including stud means and connecting rod means, said connecting rod means having a first and second end, at least a portion of said connecting rod means being parallel to said stud means, and being coupled at said head member to the eccentric at said second end; and
   first film hinge means (23) formed in said connecting rod means substantially parallel to said central axis (Z) of said head member.

2. The device as in claim 1, including a cross stud (21), wherein said stud means include first stud (16) and substantially parallel second stud (17), each having a first and second end, said cross stud being connected to said first ends of said first and second studs (16, 17), and wherein said first end of said connecting rod means is connected to said cross stud between said first ends of said first and second studs, said second ends of said first and second studs being connected to said free ends of said first and second legs, respectively, of said lower lever arm portion of said double-armed rocker arm.

3. The device as in claim 2 wherein said stud means are flexible.

4. The device as in claim 3, further including a second film hinge means (25) formed in said first stud (16) and a third film hinge means (24) formed in said second stud (17) proximate to the said free ends of said first and second legs of said lower lever arm, said second (25) and third (24) film hinge means running crosswise with respect to the central axis (Z) of said head member.

* * * * *